US006822948B2

United States Patent
Bergström et al.

(10) Patent No.: US 6,822,948 B2
(45) Date of Patent: Nov. 23, 2004

(54) SUBSCRIBER STATION, NETWORK CONTROL MEANS AND METHOD FOR CARRYING OUT INTER-FREQUENCY MEASUREMENTS IN A MOBILE COMMUNICATION SYSTEM

(75) Inventors: Karl Olof Joakim Bergström, Stockholm (SE); Thomas Rimhagen, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 811 days.

(21) Appl. No.: 09/751,950

(22) Filed: Dec. 29, 2000

(65) Prior Publication Data

US 2001/0016482 A1 Aug. 23, 2001

(30) Foreign Application Priority Data

Jan. 14, 2000 (EP) .............................. 00100205

(51) Int. Cl.⁷ ................................ H04Q 7/00
(52) U.S. Cl. ...................... 370/332; 455/437
(58) Field of Search ................ 370/329, 331, 370/332, 333, 334; 455/436, 437–444; 324/637, 639, 76.11, 76.19; 702/57, 66, 69, 71, 75, 76–6, 81–4

(56) References Cited

U.S. PATENT DOCUMENTS

| | | | |
|---|---|---|---|
| 5,533,014 A | 7/1996 | Willars et al. ................ | 370/18 |
| 5,896,368 A | 4/1999 | Dahlman et al. ........... | 370/335 |
| 6,339,646 B1 * | 1/2002 | Dahlman et al. ........... | 380/273 |
| 6,507,570 B1 * | 1/2003 | Holma et al. ............... | 370/333 |
| 6,597,679 B1 * | 7/2003 | Willars ....................... | 370/342 |
| 2001/0031638 A1 * | 10/2001 | Korpela et al. ............. | 455/449 |

FOREIGN PATENT DOCUMENTS

| | | |
|---|---|---|
| EP | 0 940 936 A1 | 9/1999 |
| EP | 99117127 | 1/2000 |
| EP | 99117128 | 1/2000 |
| EP | 99117129 | 1/2000 |
| EP | 00100205 | 6/2000 |
| EP | 1 081 977 | 3/2001 |
| EP | 1 081 978 A1 | 3/2001 |
| EP | 1 081 979 A1 | 3/2001 |
| EP | 1 181 977 A1 | 3/2001 |
| GB | 2 331 205 A | 5/1999 |
| WO | WO 97/25827 | 7/1997 |
| WO | WO 99/43178 | 8/1999 |

OTHER PUBLICATIONS

*Compressed Mode Techniques for Inter–Frequency Measurements in a Wide–band DS–CDMA System* by Maria Gustafsson, Karim Jamal and Erik Dahlman, 1977 IEEE; XP–002127494; pp. 231–235.

(List continued on next page.)

*Primary Examiner*—David Vincent
(74) *Attorney, Agent, or Firm*—Jenkens & Gilchrist, P.C.

(57) ABSTRACT

In a mobile communication network (SYS) data transmission between a radio base station (RBS) and a subscriber station (UE) is carried out by successively transmitting frames. The radio network controller (RNC) inserts at the beginning of the respective frames an indicator flag (MOP) indicating to the subscriber stations (UE) whether the frame or a succeeding frame contains data which must be read and decoded by the subscriber stations (UE). The subscriber station can by reading and decoding the indicator flag (MOP) determine that there is no necessity to read data from the present frame or a succeeding frame and can therefore use the time period of one or more frames to save network resources or to perform inter-frequency measurements on another frequency. The invention finds particular application in a WCDMA mobile communication system.

34 Claims, 12 Drawing Sheets

OTHER PUBLICATIONS

*3rd Generation Partnership Project (3GPP); Technical Specification Group (TSG); Radio Access Network (RAN); Working Group 1 (WG1); Physical Layer–Measurements*; XP–002127381; TS 25.231; V0.3.0; (Jun. 1999); pp. 1–28.

*3rd Generation Partnership Project (3GPP); Technical Specification Group (TSG); Radio Access Network (RAN); Working Group 1 (WG1); Physical layer procedures (FDD)*; TS 25.214; V1.1.0; (Jun. 1999); pp. 1–23.

*3rd Generation Partnership Project (3GPP); Technical Specification Group (TSG); Radio Access Network (RAN); Working Group 1 (WG1); Physical layer—General description*; TS 25.201; V2.1.0; (Jun. 1999); pp. 1–13.

\* cited by examiner

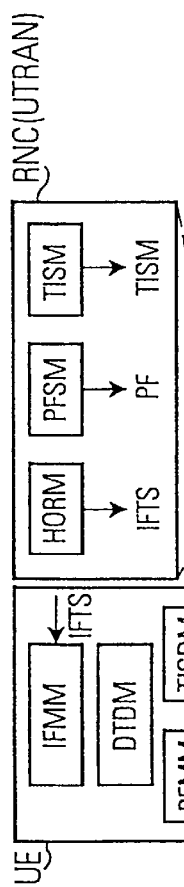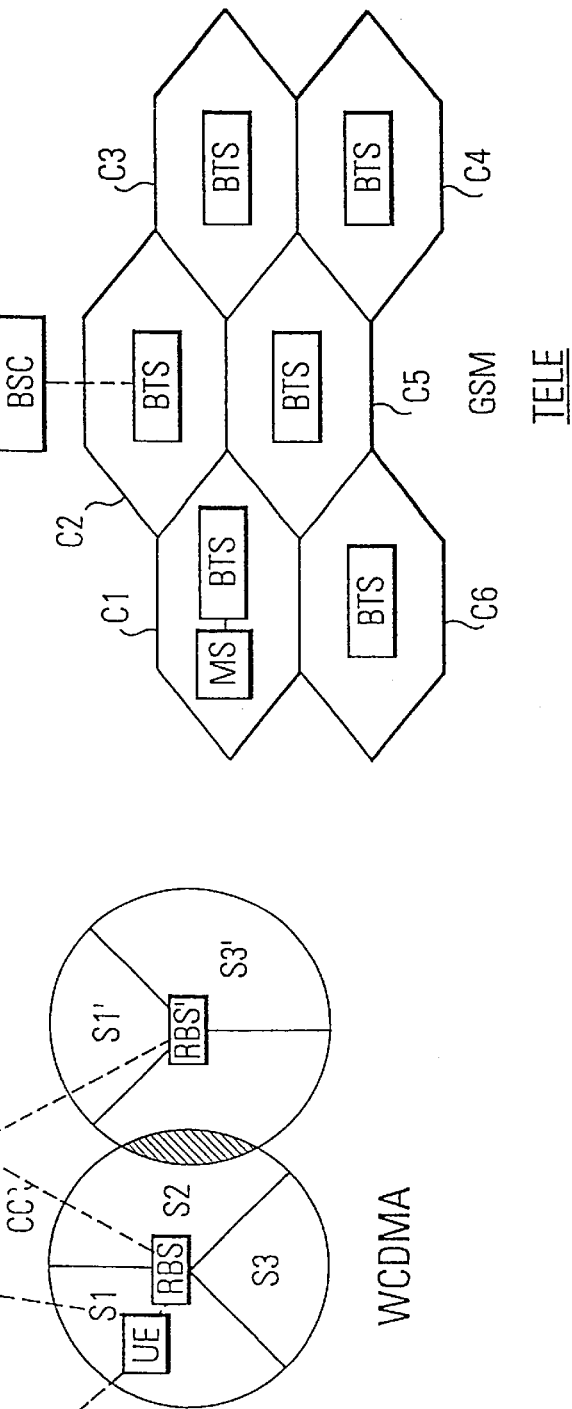
FIG.1 PRIOR ART

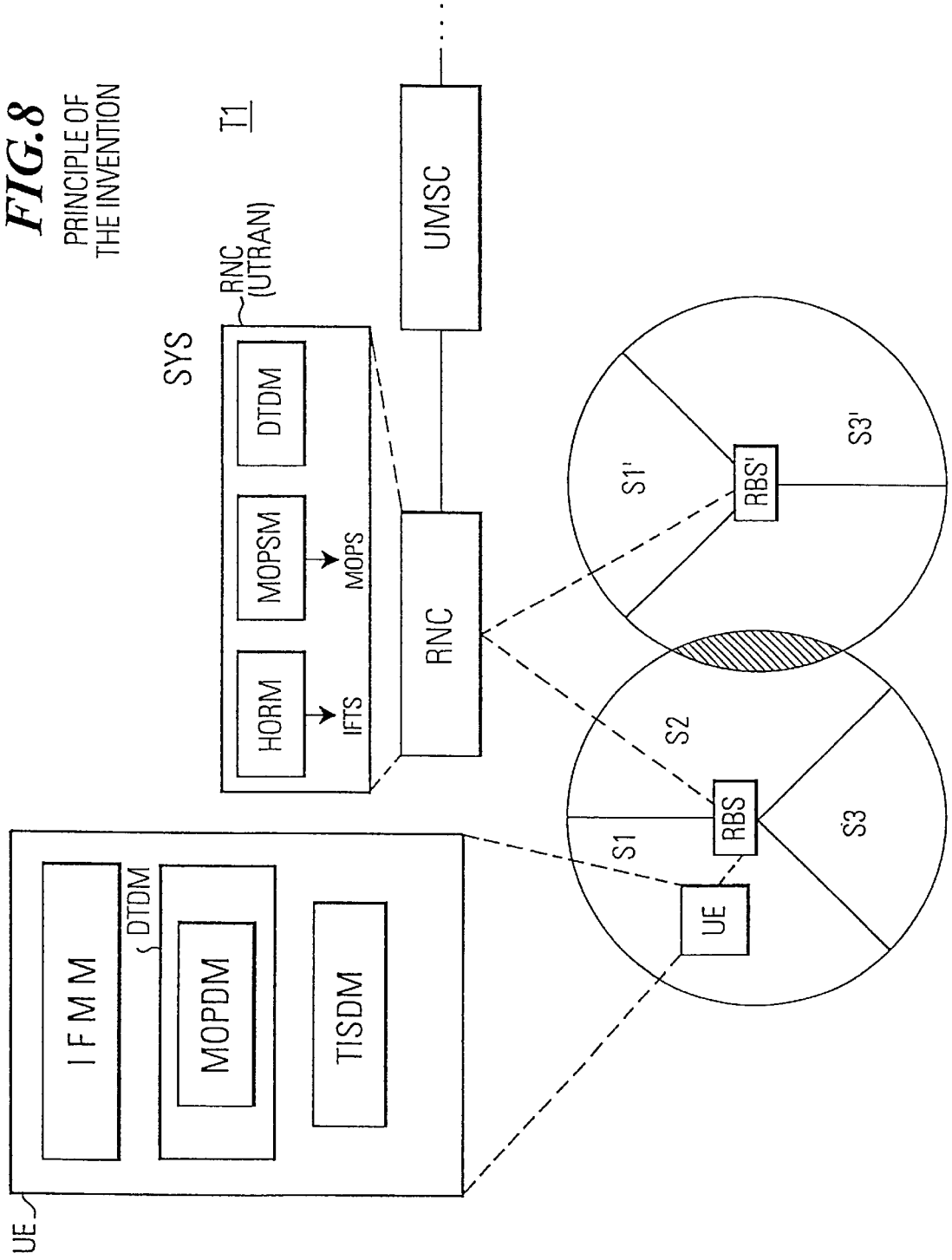

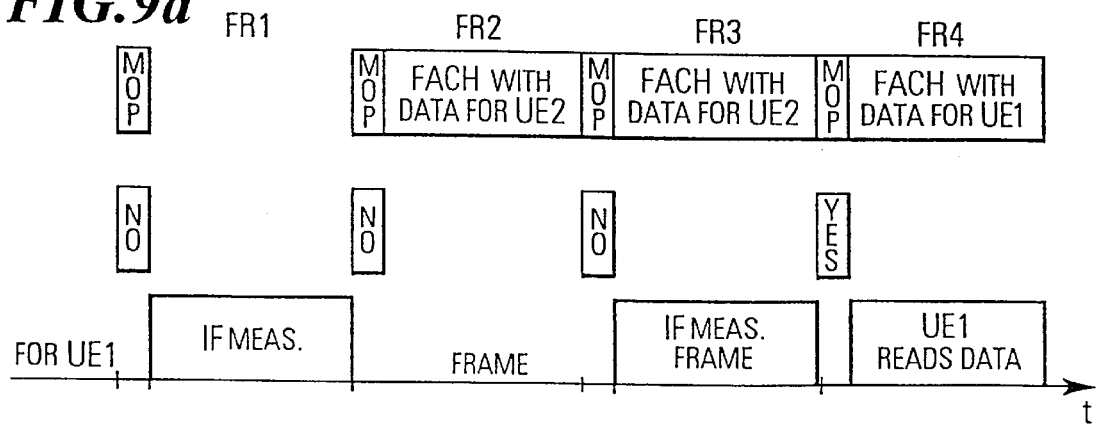
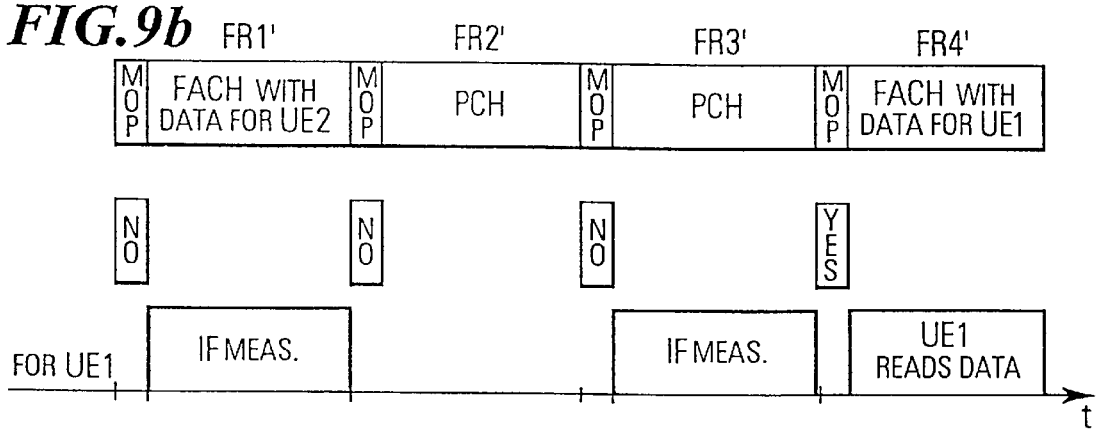
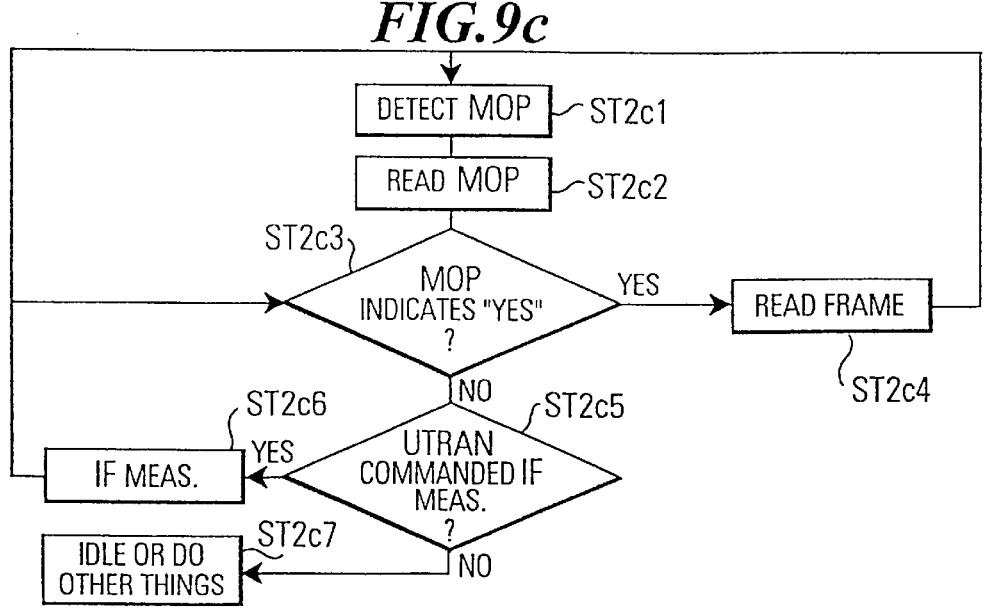

SUBSCRIBER STATION, NETWORK CONTROL MEANS AND METHOD FOR CARRYING OUT INTER-FREQUENCY MEASUREMENTS IN A MOBILE COMMUNICATION SYSTEM

FIELD OF THE INVENTION

The invention relates to a subscriber station, a network control means and a method for carrying our inter-frequency measurements in a mobile communication system. The invention also relates to a mobile communication system in which such a subscriber station, such a network control means and such a method are employed.

As will be explained with more details below, in a mobile communication system transmission conditions on a connection (communication connection or signaling connection) between a subscriber station and a base transmitter station must be monitored and the need for an inter-frequency or inter-system handover is detected, e.g. when the transmission conditions deteriorate. When the need for an inter-frequency or inter-system handover is detected, an inter-frequency measurement trigger signal is generated to indicate the need for an inter-frequency or inter-system handover and to initiate inter-frequency measurements on a different frequency than currently used. In response to the trigger signal inter-frequency measurements are carried-out by a subscriber station on one or more different frequencies and if a suitable new frequency has been found the actual inter-frequency or inter-system handover or cell-reselection takes place. Hereinafter, the term "handover" is used to designate an inter-frequency handover or an inter-system handover or a cell-reselection, even if not explicitly stated.

When a connection is established between the base transceiver station and the subscriber station, even if only a signaling connection is established with the subscriber station being in an active-mode of operation, there always exists some data traffic on the connection and the subscriber station and the network must carry out inter-frequency measurements when no data is transmitted, since otherwise some of the communicated data on the connection will be lost. Another important aspect is when and how the inter-frequency measurement trigger signal should be generated by the network to initiate the inter-frequency measurements. It should be noted that the inter-frequency measurements themselves are, however, always carried out in the subscriber station in response to the inter-frequency measurement trigger signal.

The present invention in particular addresses the problem which time interval should be used in the subscriber station for carrying-out these inter-frequency measurements.

Hereinafter inter-frequency will be abbreviated with "IF".

BACKGROUND OF THE INVENTION

With respect to a conventional method for triggering IF-measurements in a mobile communication system, FIG. 1 shows a general overview of a telecommunication system TELE which comprises at least two different mobile communication systems T1, T2. A subscriber station, e.g. a mobile station UE, which is operable in the first mobile communication system T1, may also be operable in the second mobile communication system T2. Within each mobile communication system T1, T2 the mobile station UE can move around different cells S1, S2, S3, S1', S3' and C1–C6. Due to different handover criteria the mobile station UE may perform an inter-frequency handover within the same system or an inter-system handover to/from the other system. It should be noted that the present invention is equally well applicable for triggering an inter-frequency handover within the same system and/or an inter-system handover (i.e. intra-frequency, inter-frequency and inter radio-access system measurements) and FIG. 1 only shows two mobile communication systems T1, T2 as an example where both such handover procedures may take place.

FIG. 1 shows as an example for the first mobile communication system T1 a WCDMA (Wideband Code Division Multiple Access) or CDMA (Code Division Multiple Access) communication system comprising a network control means RNC (Radio Network Controller) (which is part of the UTRAN: UMTS terrestrial radio access network), at least one base transceiver station RBS, RBS' (in WCDMA called radio base station), at least one subscriber station UE (Mobile Station) as well as a number of (possibly) overlapping cells S1, S2, S3, S1', S3'.

An example for the second mobile communication system T2 is a communication system according to the GSM (Global System for Mobile Communications), PDC (Packet Digital Cellular) and D-AMPS (Digital-Advanced Mobile Personal Service) standards.

In FIG. 1 an example of a GSM system is shown for the second mobile communication system T2. However, it should be noted that the invention can in principle be applied to any type of digital mobile telephone system and is as such not restricted to the aforementioned systems. The GSM system shown in FIG. 1 comprises the conventional units of a base station controller BSC, at least one mobile switching center MSC as well as a gateway mobile switching center GMSC. The mobile stations UE are served by a plurality of base transceiver stations BTS within the cells C1–C6 in which the mobile station UE can move around.

The network control means RNC of the WCDMA system in FIG. 1 is connected via a UMSC unit to the gateway mobile switching center GMSC of the GSM system.

Depending on the geographical layout of the first and second mobile communication systems T1, T2 the cells S1, S2, S3, S1', S3' of the first mobile communication system T1 may also completely or partially overlap with the cells C1–C6 of the second mobile communication system T2. Of course, if the mobile station UE is to carry out an inter-system handover—then the mobile station UE will be able to operate according to the specifications of the first and the second mobile communication system.

One reason for performing inter-frequency or inter-system handovers in the telecommunication system TELE in FIG. 1 may be due to coverage reasons. This is due to the fact that neither the first communication system nor any other system has a complete coverage in all geographical areas, e.g. hot spots in UMTS. Furthermore, some cells within the mobile communication system may operate on frequencies which are not applicable in adjacent cells. Therefore, by letting the mobile station UE (or in fact the network control means RNC) perform either an inter-frequency handover of an inter-system handover, the mobile station UE can be used in a larger area without interruptions in the communication.

Another reason for the handover may be capacity reasons. Either the mobile communication system or other mobile communication systems may become heavily loaded at times, so that an inter-system handover may be required. Analogously, the mobile station UE may have established a connection on a particular frequency and it may be necessary that another frequency is to be used due to decaying transmission conditions. This other frequency may be present within the same cell or in another cell and both are generally termed inter-frequency handover. As indicated in FIG. 1, the inter-frequency measurements (necessary for an inter-frequency handover/or an inter-system handover) is always carried-out by an inter-frequency measurement means IFMM situated in a mobile station UE.

The network control means RNC comprises a paging flag sending means PFSM for sending a paging flag to the mobile station UE when a signaling communication link has already been established between the subscriber station UE and the network. For example, when the mobile station UE has been switched on and has been registered in the network, the subscriber station is in a registered and non-active mode of operation. A standby operation means holds the subscriber station in such a non-active mode of operation. In such a non-active mode of operation the operation of the subscriber station UE is invoked by receiving the paging flag PF from the network control means RNC, namely when a call is pending for the subscriber station UE and when a communication connection is to be set up to the subscriber station UE.

FIG. 2 shows a general flow chart of a method for carrying-out an inter-frequency or inter-system handover in a mobile communication system when a signaling connection or a communication connection is set up. In step ST11 a handover means HORM (HandOveR Means) situated in the network control means RNC or the mobile station UE monitors the network performance regarding the capacity/coverage aspects as explained above. In step ST12 the handover means HORM decides whether in principle a handover is necessary according to the criteria determined in step ST11. If so ("Y" in step ST12), the mobile station is triggered to perform inter-frequency measurements in step ST13. More particularly, in step ST13 an IF measurement trigger signal IFTS is output by the handover means HORM. The IF-measurements means IFMM can be triggered by a mobile-evaluated-handover trigger signal IFTS or a network-evaluated-handover trigger signal IFTS in step ST13.

In order to perform a fast and reliable inter-frequency handover when there is the need for such a handover, it is advantageous to provide the outputting of a reliable trigger signal IFTS in either the network control means RNC and/or in the mobile station UE. Of course, in order to provide a well-designed trigger procedure, there is not a single triggering condition that needs to be monitored in step ST11 and which will eventually trigger the mobile station UE to perform IF-measurements on other frequencies or systems. Usually, a couple of conditions are monitored in step ST11 and must be fulfilled that the trigger signal is output in step ST13. Such conditions may for example comprise an excessively high output power from either the down-link (network to subscriber station) connection or the up-link (subscriber station to network) connection and/or a high load in the cell. If for example the network detects by measuring the uplink-interference a high load in the cell, it will attempt to trigger IF-measurements and thus a handover to a different cell or a different system. Likewise, if transmission conditions deteriorate, the mobile station UE is triggered to more and more increase its output power and therefore a high output power also indicates the need for IF-measurements and thus the need for a handover.

The prior art reference TS 25 231 V0.3.0, technical specification: Third Generation Partnership Project (3GPP); Technical specification group (TSG), radio access network (RAN); working group 1 (WG 1); Physical Layer-Measurements in the IS 95 standard, dated June 1999 (hereinafter referred to as reference [1]) describes in particular in chapters 3., 4., 5.1.2 a number of conventional measurement trigger criteria. In the mobile communication system described in reference [1] both a network handover means HORM and a subscriber station handover means monitor the performance of the radio-link (RL) and can request a handover. For example, the network handover means HORM monitors the down-link by measurement reports from the subscriber station UE. The network handover means HORM also monitors the traffic load. As explained above, a hand-over evaluated by a mobile station UE is called a mobile-evaluated hand-over, abbreviated MEHO. A hand-over evaluated by the network is called a network-evaluated hand-over, abbreviated NEHO. Since the mobile station UE and the network control means RNC each comprise a handover means each can initiate a handover according to the triggering conditions which are respectively monitored. The four basic criteria during the monitoring in step ST11 in the prior art are the "base station traffic load exceeded" condition, the "distance limits exceeded" condition, the "pilot strength below a predetermined threshold" condition and the "power level exceeded" condition as is described in the aforementioned reference [1].

In response to the generation of an IF measurement trigger signal IFTS in step ST13 (generated by the subscriber handover means HORM or the network handover means HORM), the subscriber station will perform IF measurements in a given time interval in step ST21. As explained above, in order to perform a fast and reliable inter-frequency handover, it is advantageous to let the subscriber station UE perform signal quality measurements on a different frequency, e.g. in a target cell or in a different system, and to report these to the network control means RNC, such that the network control means RNC can base its handover decisions, as to which cell the subscriber station UE is to be handed over, on these reported signal quality measurements. As explained below, the performing of IF-measurements in the subscriber station UE is not a trivial task. For example, in CDMA and FDMA systems the receiver of the subscriber station UE is normally busy receiving information on the current frequency and thus some measurement time has to be created in some way in such systems in order to allow inter-frequency measurements without a drastic loss of data.

Conventional methods for determining a time interval in which field measurements are carried out will be described below with reference to FIGS. 3-1, 3-2, FIGS. 4-1, 4-2.

As shown in FIG. 3-1, in a CDMA communication system the data communication is generally performed by exchanging data frames FR consisting of a plurality of time slots TS1 ... TS15. Each time slot comprises a control portion CP and a data portion DP. As described in reference [2]: TS 25.201 V2.1.0, a third generation partnership project (3GPP); technical specification group (TSG); radio access network (RAN; working group 1 (WG1); physical layer-general description, dated June 1999, and as also indicated with step ST21' in FIG. 3-2 and in FIG. 3-1, it also possible to carry out the data transmission in a compressed mode (also called slotted mode) in order to create some time for the IF measurement. For this purpose the network control means RNC comprises a compressed mode setting means in which the data contained in the data portion DP is compressed, i.e. concentrated to a smaller part of the frame, resulting in an idle time portion ITP. The subscriber station UE can comprise a compressed mode determining means which determines i.e. realizes—being informed about the compressed mode of transmission via signaling or some information sent from the compressed mode setting means of the network control means RNC—the compressed mode of operation. If such a compressed mode of operation is detected, the subscriber station UE enters a compressed mode of operation and performs the IF measurements in the idle time IT in step ST21" in FIG. 3-2.

In a CDMA system such a concentration of information is achieved by reducing the processing gain G=chips/ information bits=1/SF, e.g. by decreasing the spreading factor SF. Another possibility how the concentration of information can be achieved is by changing the channel coding scheme, e.g. from r=⅓ to r=½. Due to the compressed mode of operation a time interval IT is generated in which the IF measurements can be carried out by the IF measurement means IFMM in the subscribed station UE.

FIG. 4-1 and steps SC21''' and ST21'''' also show another possibility of how a time interval can be provided in which the field measurements can be carried out. In a GSM system, a specific time slot FMS of a frame consisting of a plurality of TDMA time slots TS1 . . . TS-M is specified and the field measurements are carried-out in the portion FMP. That is, in a GSM system a predetermined field measurement slot is provided in which no data is sent from the network control means or the base station transmitter to the subscriber station UE. This slot has been agreed upon by subscriber station UE and the network control means (i.e. set in the protocol) and is fixed.

As shown in FIG. 2 and in FIGS. 3-1, 4-1, the network control means RNC triggers the mobile station and step ST13 to perform the IF measurements and it will also indicate to the subscriber station UE on which frequency belonging to a different cell or a different system said IF measurements are to be carried-out. The subscriber station SS will report the IF measurements back to the network control means RNC within a predetermined time. Then, in step ST22, the network control means RNC will determine whether a handover to the selected frequency (cell or different system) is possible. If it is not possible, because for example a too high interference is detected on the new frequency, the network control means selects a new target cell (frequency) in step ST23 and the IF measurements are repeated by the subscriber station UE in step ST21. Furthermore, the network control means RNC can order the subscriber station UE to perform a periodic search or a single search. Such a procedure is for example described in reference [1] for a synchronized communication system.

In some systems like CDMA 2000 the subscriber station UE not only reports the IF measurements back to the network control means, but it also indicates to the network control means RNC how long (time-wise) and when (the starting time) the subscriber station UE will be able for performing the desired IF measurements. If the network control means RNC has knowledge of the time-interval in which the subscriber station UE intends to perform the IF measurements, then the network control means RNC can make some provisions to compensate for data frames, which would be sent by the network control means RNC, but which the subscriber station UE would not process in the time interval in which it performs the IF measurements. That is, actually data frames will get lost in the time period in which the subscriber UE performs the field measurements unless further provisions are made.

One possibility to compensate this is that the network control means RNC increases the power before or after the measurement time interval or the intervals. Since the error rate is always evaluated over a plurality of data frames, such an increase of power before and after the measurement time interval enables to keep the overall quality for error rate to an average level which will not exceed the requirements of an average error rate.

Summarizing the above disadvantages of providing a time interval for IF measurements according to the afore described prior art, such provisions of the measurement time interval will result in a decreased quality of service (e.g. due to loss of frames), require a complicated system modification (due to the incorporation of PN sequence generators), and will shorten the lifetime of the battery in the subscriber station UE (if the power is increased before and after the time interval).

PRIOR ART DOCUMENTS

European patent application EP 99 117 128.1 describes a subscriber station for performing IF measurements in a predetermined time interval as shown in FIG. 5. That is, a data transmission determining means DTDM in the subscriber station determines a time interval in which no data transmission takes place from the base transceiver station to the subscriber station. This is illustrated with steps ST211, ST212 in FIG. 5. In this patent application the time interval in which no data transmission takes place is determined by the subscriber station by determining in a data frame received from the base transceiver station RBS the power ratio of the information contained in the data portion DP to the information contained in the control portion CP. The subscriber station determines that no data transmission will take place in a time interval corresponding to a predetermined number of data frames or data slots following the output of IF measurement trigger signal, if the determined power ratio is below a predetermined power ratio. A second possibility in this patent application is that the subscriber station monitors the transmission of a paging flag from the base transceiver station RBS. When no transmission of the paging flag is detected, it is determined that a data transmission will not take place in a time interval corresponding to a predetermined number of data frames or data slots after detecting said paging flag.

However, in this method it is still possible that actually data is directed to the subscriber station even if the power ratio is below a predetermined threshold, e.g. due to errors during the data transmission.

In the European patent application EP 99 117 129.9 a subscriber station carries out IF measurements in response to an IF measurement trigger signal sent by the network control means. Furthermore, the network control means RNC comprises an IF measurement time interval indication signal TIIS indicating a time interval of an established connection between the subscriber station and the base transceiver station in which IF measurements are to be carried out by the subscriber station. As indicated with step ST211 in FIG. 6, the network control means determines this time interval as a time interval where a temporary reduction of the quality of service is accepted. For the case of a delay-sensitive data transmission frames in the time interval are deleted and a transmission power on the down-link and the up-link on the communication connection before the beginning of said time interval and/or after the end of said time interval is increased. In case of a loss-sensitive data transmission it is suggested that during the time interval indicated by the network control means the transmission frames are buffered in a transmitter buffer means such that some (empty) frames are available in said time interval for the subscriber station to carry out its IF measurements.

However, in this case a temporary reduction of the quality of a service may still take place, if too many frames need to be buffered or if frames are accidentally are deleted.

SUMMARY OF THE INVENTION

The above described disadvantages are again summarized in the block diagram of FIG. 7a. In FIG. 7a the network control means RNC (part of UTRAN: UMTS Terrestrial Radio Access Network) orders the mobile station UE (UE: User Equipment) the on down-link transmission channel DL (FACH) to perform IF measurements and the UE uses these IF measurements to make cell-reselection decisions. As explained above, the measurement control order may contain intra-frequency, inter-frequency and inter-radio access-system measurements (for example, when the mobile communication system SYS is a WCDMA system).

In particular, in a special connected mode, called the cell connected state, cell_FACH-substate, the subscriber station UE is requested to continuously monitor a special channel (the FACH channel) on the down-link DL in order to be able to receive its own down link traffic. As indicated in FIG. 7b, on the monitored FACH channel the network control means plans the insertion of user date UE2, UE1 in frames which are sent from the base transceiver station RBS. This means, that in a heavily loaded cell with an extensive FACH traffic, it is impossible for the subscriber station UE to perform inter-frequency measurements, using one receiver, without losing any FACH information, independent as to whether the special information is intended for the individual subscriber station or for other subscriber stations. The simple reason is that there is no time, since the subscriber station in practice has to read an entire frame before realizing to which subscriber station the data contained in the frame belongs.

As indicated in FIG. 7c, it is also possible that the FACH channel is multiplexed with another channel, the PCH channel, on a so-called secondary common control physical channel SSCPCH. The PCH channel is the paging channel on which paging records are sent from the base transceiver station RBS to the subscriber station. When both channels are multiplexed on the SSCPCH channel, then the PCH channel has priority over the FACH channel (FACH: Forward Access Channel), but on the other hand it is only sent when there is a paging record to be sent to anyone in the cell. In the cell_FACH state the subscriber station UE is paged on the FACH channel and not the PCH channel. Consequently, in principle it is not necessary for the subscriber station UE to read to read the PCH frames.

However, as already explained with reference to FIG. 7b, also in FIG. 7c the subscriber station UE first has to read the entire frame before it can determine whether it is a FACH channel containing possibly data intended for the subscriber station or whether it is a PCH channel which the subscriber station would actually not have to read.

Therefore, the subscriber station UE in a connected mode, cell-connected state, cell_FACH substate, for example in a highly loaded cell, experiences the high traffic on the secondary common control channels all the time. The subscriber station must read and decode every frame. Only when the frame has been decoded the subscriber station knows whether it was a FACH frame or a PCH frame. Only then the subscriber station UE can discard the data of the PCH frame. On the other hand, the FACH frame is read entirely if the subscriber station UE determines that it contains data intended for the subscriber station UE. If the subscriber station UE detects that the FACH frame does not contain any data intended for it, it will afterwards discard the data.

However, if the subscriber station UE would receive a trigger signal to perform IF measurements, it would have to leave the SCCPCH channel to perform the inter-frequencies, i.e. the subscriber station UE cannot read and decode the frames on the SCCPCH channel any longer. This might imply a loss of data because the subscriber station UE will not know what is sent when it performs temporarily its inter-frequency measurements. Thus, the subscriber station can do nothing else but guessing when a data transmission is not directed to it or to use one of the above described methods in FIGS. 1–6 with the above described disadvantages.

Therefore, the object of the present invention is to provide a subscriber station, a network control means, a telecommunication system and a method which allows to perform IF measurements without any loss of data at the subscriber station, not even a temporary degradation of the transmission quality.

This object is solved by a subscriber station of a mobile communication system GSM; WCDMA, SYS including an inter-frequency IF measurement means IFMM adapted to perform IF measurements and a data transmission determining means DTDM adapted to determine a predetermined time interval in which a base transceiver station RBS does not direct to subscriber stations UE1, UE2 a data transmission on at least one down-link transmission channel FACH, PCH, SCCPCH on which data transmissions are performed by sending data frames FR1–FR4 from the base transceiver station RBS to one or more subscriber stations UE1, UE2, wherein said IF measurement means IFMM is adapted to perform said IF measurements in said predetermined time interval, characterized in that said data transmission determining means DTDM includes a measurement opportunity indicator determining means MOPDM for monitoring the receipt of a measurement opportunity indicator MOP transmitted from said base transceiver station RBS and for determining as said predetermined time interval the time interval of at least one frame in said down-link transmission channel FACH, PCH, SCCPCH.

Furthermore, this object is solved by a network control means RNC of a mobile communication system GSM; WCDMA, SYS comprising a plurality of subscriber stations UE each including an inter-frequency IF measurement means IFMM adapted to perform IF measurements and a data transmission determining means DTDM adapted to determine a predetermined time interval in which a base transceiver station RBS of said system does not direct to said subscriber stations UE1, UE2 a data transmission on at least one down-link transmission channel FACH, PCH, SCCPCH on which data transmissions are performed by sending data frames FR1–FR4 from the base transceiver station RBS to one or more subscriber stations UE1, UE2, wherein each said IF measurement means IFMM is adapted to perform said IF measurements in said predetermined time interval.

The object is also solved by a method for performing inter-frequency IF measurements in a subscriber station UE of a mobile communication system GSM; WCDMA, SYS wherein in said subscriber station UE a predetermined time interval is determined in which a base transceiver station RBS will not direct to said subscriber station UE1 a data transmission on at least one down-link transmission channel FACH, PCH, SCCPCH on which data transmissions are performed by sending data frames FR1–FR4 from a base transceiver station RBS to one or more subscriber stations UE1, UE2, characterized by the following steps: monitoring the receipt of a measurement opportunity indicator MOP transmitted from said base transceiver station RBS to said subscriber station UE; and determining as said predetermined time interval the time interval of at least one frame in said down-link transmission channel FACH, PCH, SCCPCH.

Furthermore, the object is solved by a telecommunication system comprising at least one subscriber station and at least one network control means as mentioned above.

According to the invention the network control means contains a network data transmission determining means for determining a time interval of at least one frame in a down-link transmission channel in which a base transceiver station of said system does not direct to said subscriber stations a data transmission. A measurement opportunity indicator sending means contained in the network control means then sends to one or more subscriber stations a measurement opportunity indicator when said network data transmission determining means determines said one or more frames in which no data transmission takes place.

The subscriber station according to the invention contains a data transmission determining means with a measurement opportunity indicator determining means for monitoring the receipt of a measurement opportunity indicator transmitted from said base transceiver station and for determining as said predetermined time interval the time interval of at least frame in said down-link transmission channel beginning with the detection and receipt of said measurement opportunity indicator inserted by the network control means.

Since the network will always indicate to the subscriber station by means of the measurement opportunity indicator when a data transmission to an individual subscriber station or to all subscriber stations is carried out or is not carried out, the loss of any data can be avoided if the IF measurement means in the subscriber station carries out its IF measurements exactly in the time intervals following the receipt and detection of the measurement opportunity indicator.

Preferably, the measurement opportunity indicator is transmitted on the down-link transmission channel at the beginning of a frame or on a separate control channel synchronized to the beginning of a frame in said down-link transmission channel.

It is also possible, that the measurement opportunity indicator inserted at the beginning of a particular frame indicates that only a few frames later no data transmission takes place from the network to the subscriber station.

The down-link transmission channel can include a first type data transmission in which data is sent in frames from the base transceiver station to the subscriber station or a second type of data transmission where paging data is transmitted in frames. Both types of data transmission may be multiplexed on a common transmission channel.

The measurement opportunity indicator can indicate the number of succeeding frames over which the IF measurements should be carried out. Possibly, the measurement opportunity indicator also indicates a subscriber station identification which identifies at least one subscriber station which can carry out IF measurements in said at least one frame following the receipt of the measurement opportunity indicator.

If the mobile communication system is a WCDMA (Wideband Code Division Multiple Access) communication system, the down-link transmission channel is a forward access channel FACH and thus a first type of data transmission is a data frame transmission on said forward access channel. Preferably said second type of data transmission is a page data frame transmission of a page channel PCH.

Said transmission channel on which said first type of data transmission and said second type of data transmission is multiplexed can be a secondary common control physical channel SCCPCH in said WCDMA communication system.

It is also possible to transmit the measurement opportunity indicator on a separate channel, for example a paging indication channel PICH in a WCDMA communication system.

Further advantageous embodiments and improvements of the invention may be taken from the dependent claims. Furthermore, the invention can comprise embodiments resulting from a combination of aspects and features which have been separately described and/or claimed in the description and/or the attached claims.

Hereinafter, embodiments of the invention will be described with reference to the attached drawings.

BRIEF DESCRIPTION OF THE DRAWINGS

FIG. 1 shows a principal overview of a telecommunication system TELE comprising at least two different mobile communications systems T1, T2 according to the prior art;

FIG. 3-1 shows the constitution of data frames and time slots when a compressed mode of operation is used;

FIG. 3-2 shows a flow chart similar to FIG. 2 when a compressed mode of operation is used as shown in FIG. 3-1;

FIG. 4-1 shows the provision of a field measurement time slot FMP in a conventional TDMA mobile communication system such as GSM;

FIG. 4-2 shows a flow chart similar as in FIG. 3-2 for the case when field measurements are carried out in a specific field measurement time slot as shown in FIG. 4-1;

FIG. 8 shows a block diagram of the network control means and the subscriber station according to the present invention;

FIG. 9a shows one embodiment of the method according to the invention when only the FACH channel is transmitted on the secondary common control physical channel;

FIG. 9b shows an example where the PCH and FACH channels are multiplexed on the secondary common control physical channel;

FIG. 9c shows a flow chart of the method according to the invention; and

Figure 2:
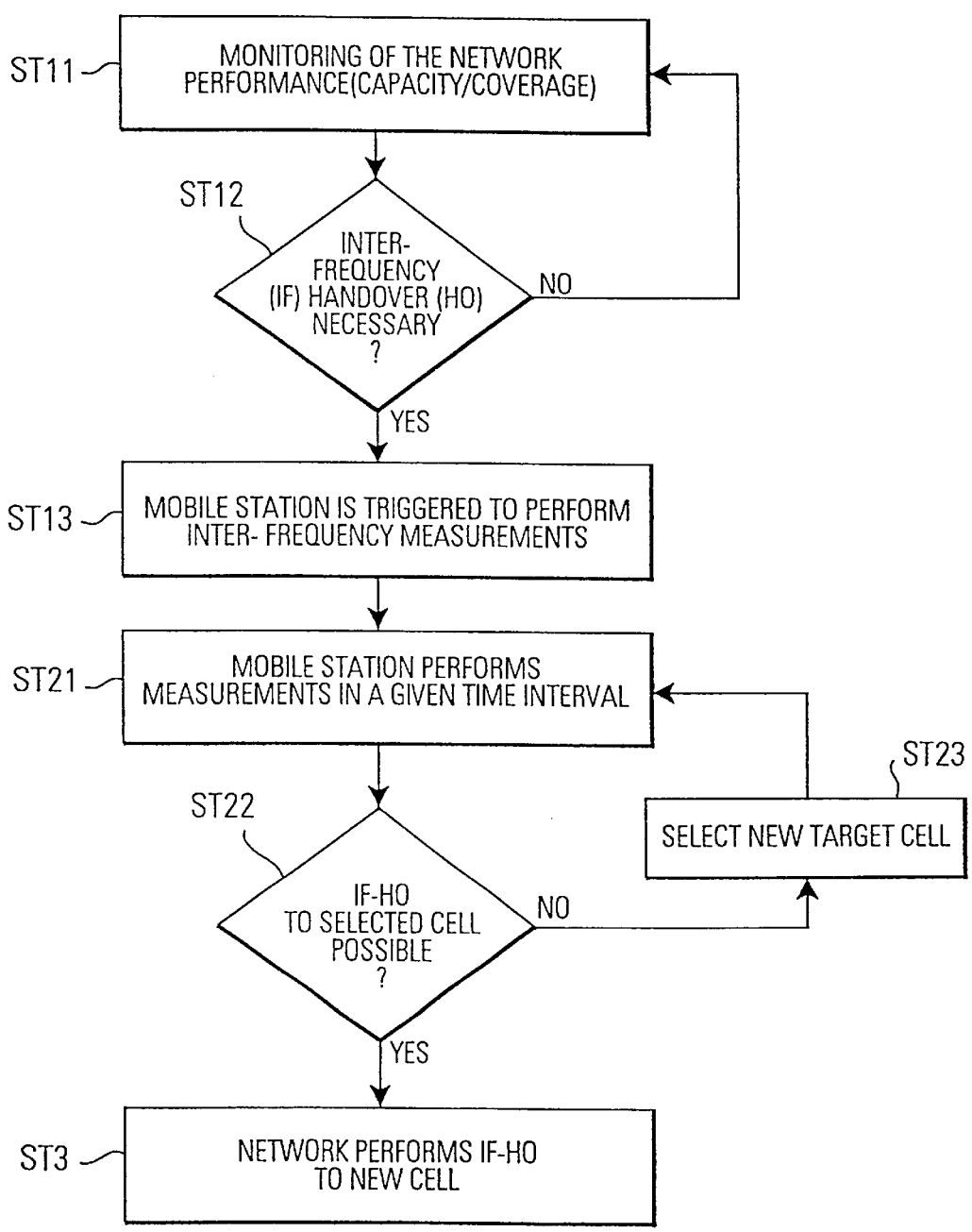
FIG. 2 shows a flow chart for performing an inter-frequency and/or inter-system handover in the telecommunication system TELE shown in FIG. 1.
Figures 1, 3:
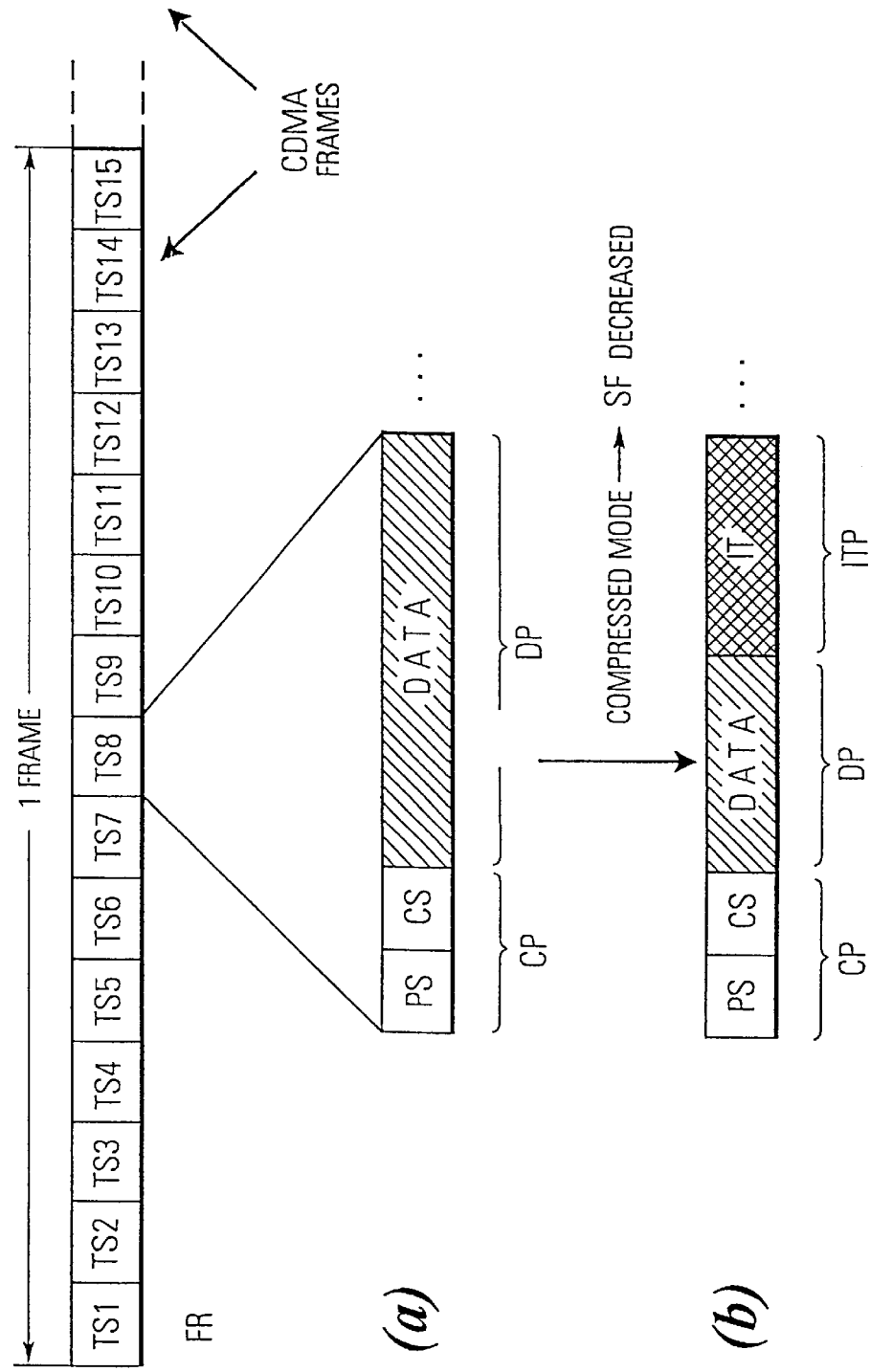
Figures 2, 3:
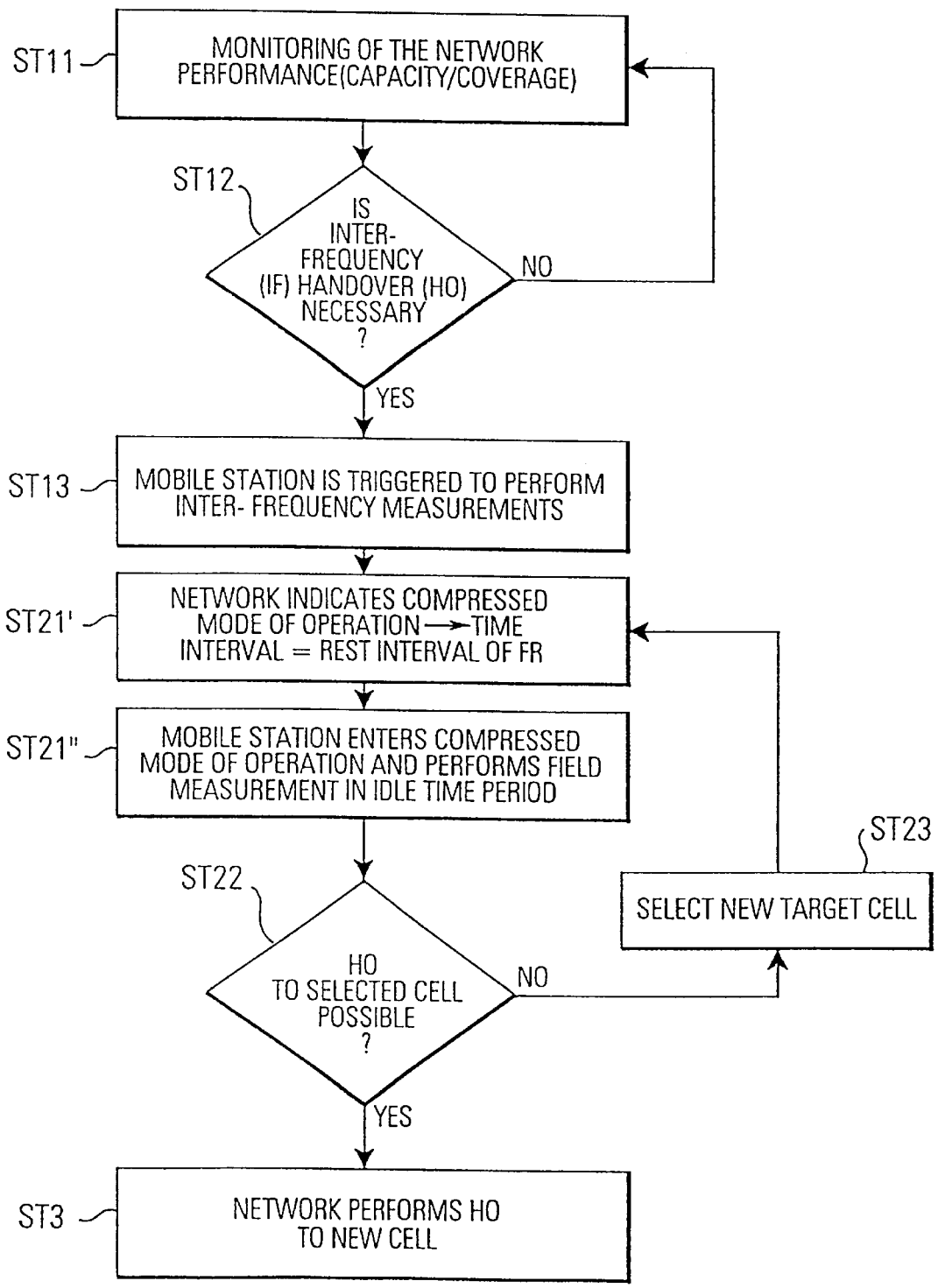
Figures 1, 4:
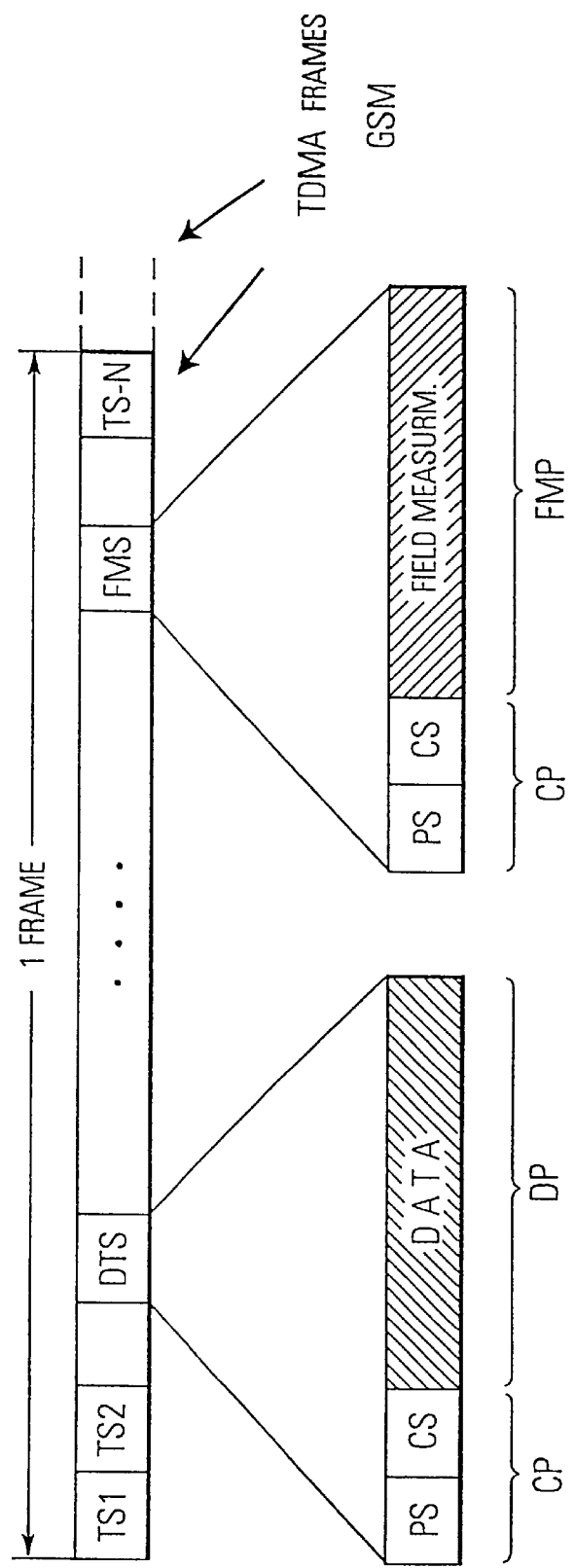
Figures 2, 4:
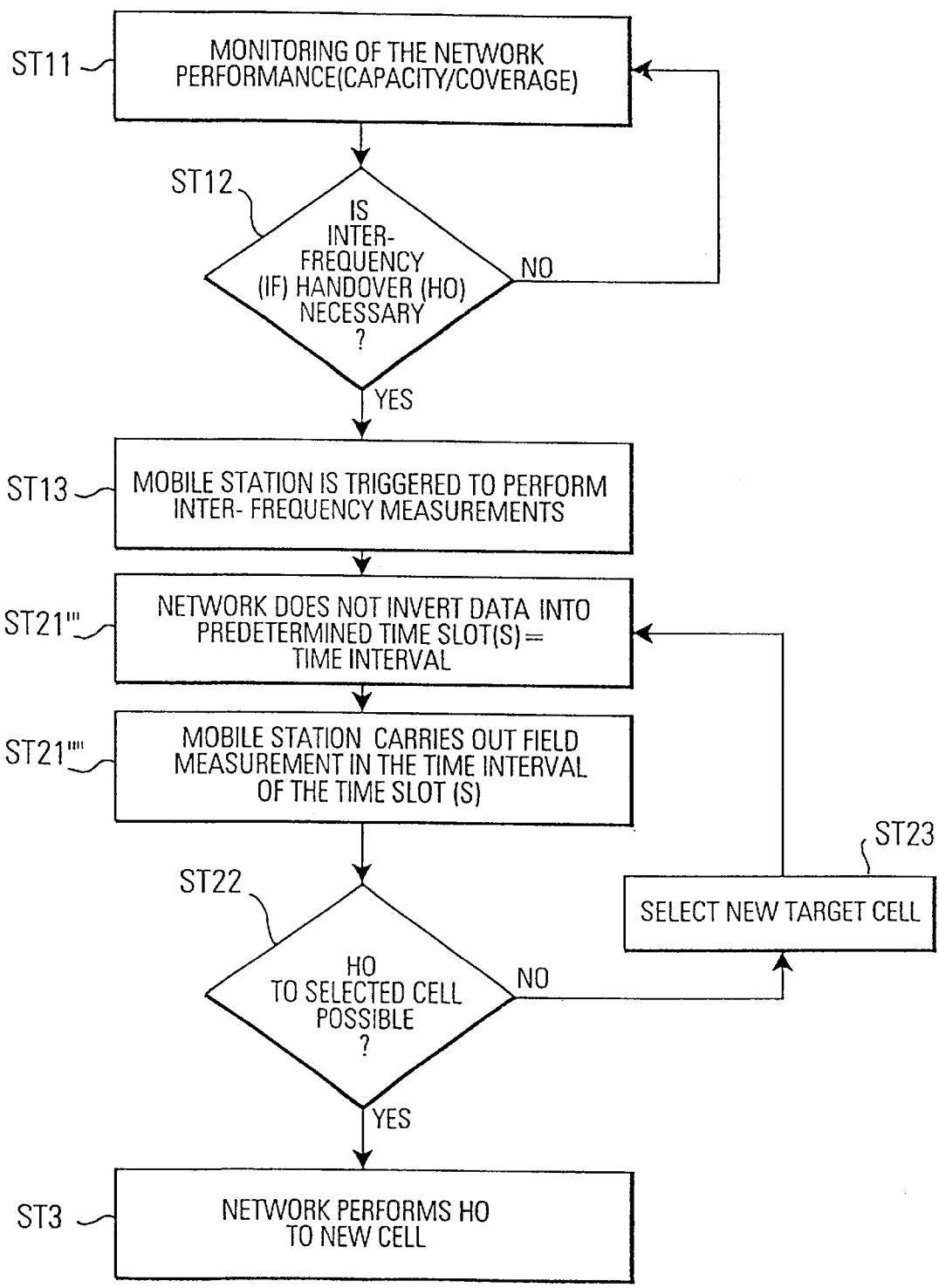
Figure 5:
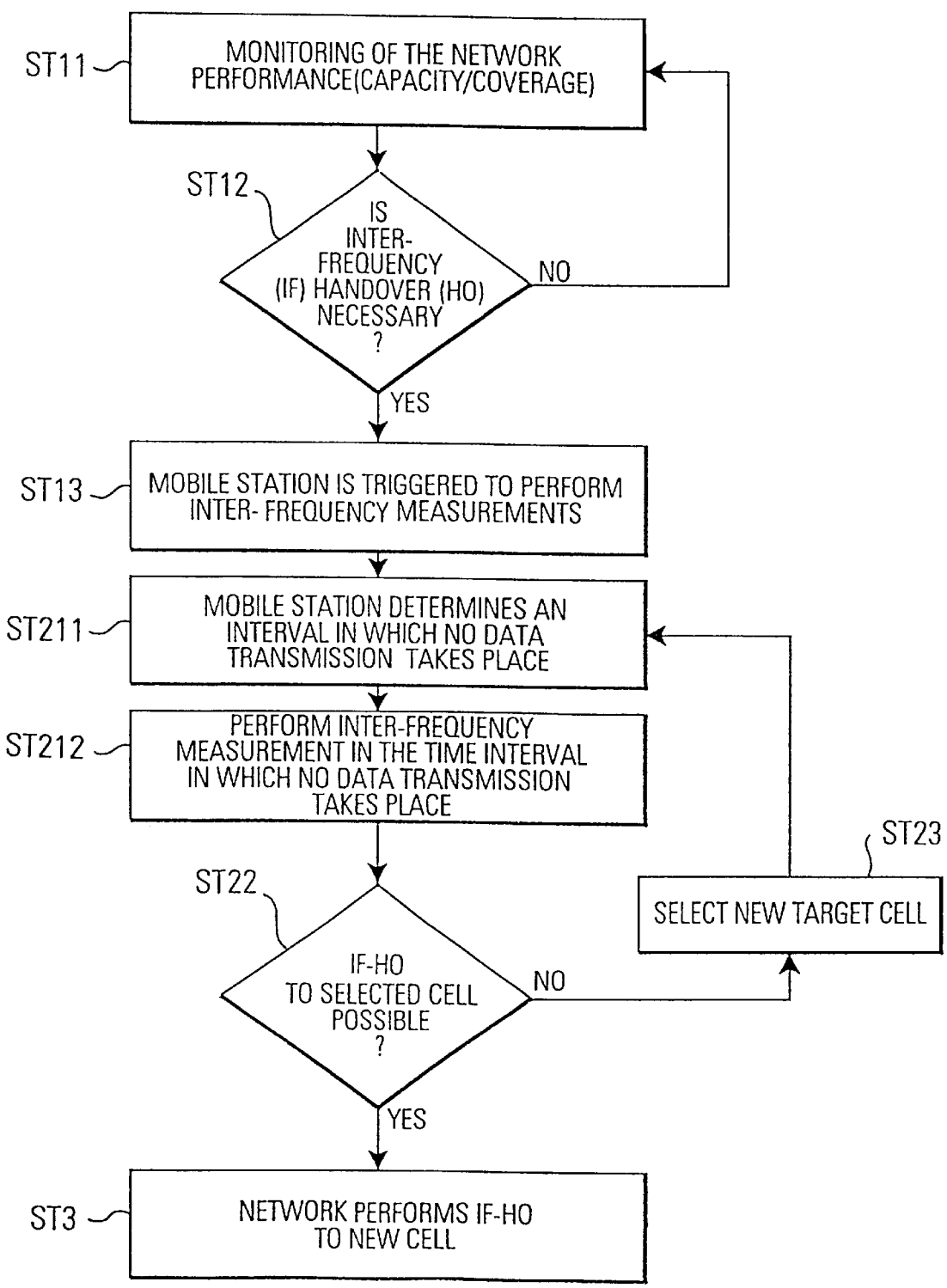
FIG. 5 shows a flow chart similar to FIG. 2 for performing inter-frequency measurements according to the European patent application Nr. 99 117 128.1.
Figure 6:
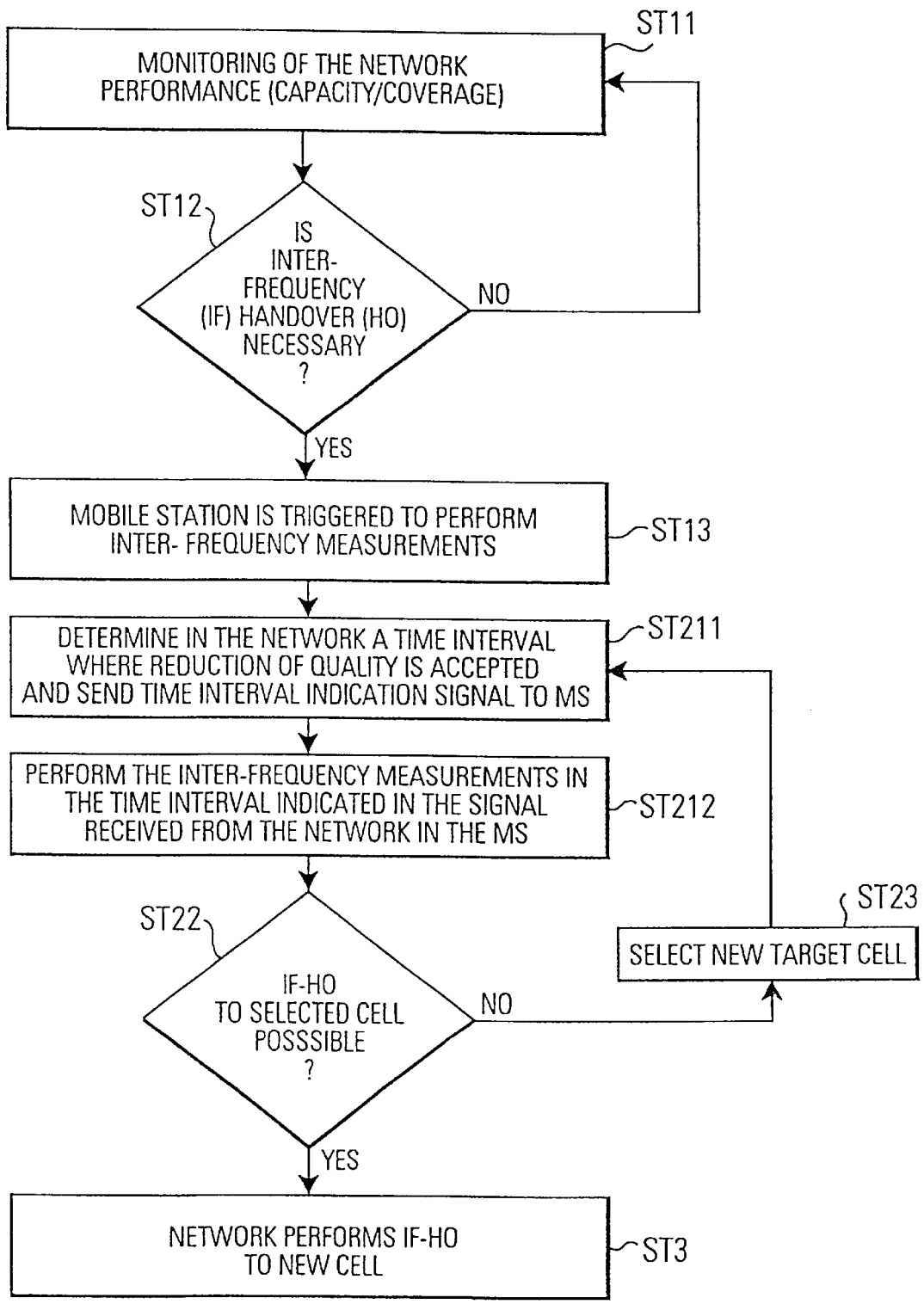
FIG. 6 shows a flow chart similar to FIG. 2 for performing inter-frequency measurements according to the European patent application Nr. 99 117 128.1.

It should be noted that throughout the drawings the same or similar reference numerals designate the same or similar steps and features. In particular, the units described for a conventional subscriber station UE and a conventional network control means RNC in FIG. 2 are also present in the embodiments of the invention. Furthermore, it should be noted that the invention is not restricted to the specific CDMA, WCDMA, D-AMPS or GSM systems described above. That is, the invention can be applied to any telecommunications system where a handover or cell-reselection in idle-mode needs to be performed between frequencies, cells and different systems.

PRINCIPLE OF THE INVENTION

FIG. 8 shows a block diagram of a network control means RNC, e.g. part of a UTRAN (UTRAN: UMTS Terrestrial Radio Access Network) and a subscriber station UE in a communication system according to the invention. In the mobile communication system shown in FIG. 8 a plurality of subscriber stations UE each including a inter-frequency measurement means IFMM adapted to perform IF measurements and a data transmission determining means DTDM are provided. The data transmission determining means DTDM is adapted to determine a predetermined time interval in which a base transceiver station RBS of said system does not direct to said subscriber stations UE1, UE2 a data transmission on at least one down-link transmission channel (for example a FACH channel, a PCH channel, a SCCPCH channel) on which data transmissions are performed by sending data frames from the base transceiver station to one or more subscriber stations. The subscriber station also contains a IF measurement means IFMM adapted to perform said IF measurements in said predetermined time interval.

According to the invention, the network control means comprises a network data transmission determining means DTDM for determining as said predetermined time interval a time interval of at least one frame in said down-link transmission channel in which a base transceiver station RBS of said system does not direct to said subscriber stations a data transmission. When the network data transmission determining means determines such a time interval, a measurement opportunity indicator sending means sends to one or more subscriber stations a measurement opportunity indicator signal MOPS.

The subscriber station contains a data transmission determining means DTDM including a measurement opportunity indicator determining means MOPDM for monitoring the receipt of a measurement opportunity indicator transmitted from said base transceiver station RBS and for determining as said predetermined time interval the time interval of at least one frame in said down-link transmission channel. Preferably, it determines as said predetermined time interval the time interval of at least one frame in said down-link transmission channel beginning with the receipt of said measurement opportunity indicator MOP. Based on the determination of this indicator MOP a time interval signal determining means TISDM determines the time interval which is then used by the IF measurement means IFMM to carry out the IF measurements.

Therefore, according to the invention there will be no loss of data on the subscriber station side and not even a temporary reduction of the transmission quality since the network control means RNC (part of UTRAN) appropriately indicates on the down-link transmission channel which of the frame time intervals can be used for carrying out IF measurements because actually no data is directed from the base transceiver station RBS to the subscriber station or data is directed to the subscriber station but is not relevant to be decoded (read) by one or more subscriber stations. With the coordination of these measurements by the network control means RNC the network data loss can thus be prevented.

It is possible, that the measurement opportunity indicator MOP is inserted at the beginning of each frame in the down-link transmission channel and indicates that the frame in which it is contained does not contain any data at all (no data transmission) or does contain data which is however not to be decoded by one or more indicated subscriber station(s). However, the measurement opportunity indicator can also indicate one or more succeeding frames rather than only indicating that the frame in which it is contained can be used for the IF measurements. Preferably, the measurement opportunity indicator can be a single bit inserted as a yes/no-flag at the beginning of each frame. For example, a "0" can indicate that no data transmission or a data transmission with no relevant data is performed whilst a "1" indicator bit indicates that there is relevant data to be decoded by all or some subscriber stations. If the measurement opportunity indicator contains several successive bits, this can be used to indicate for each of a number of succeeding frames (including the frame in which the MOP is included) the respective decision as to whether or not IF measurements can be carried out. Possibly, the MOP can also indicate the Read/no-read decision for one or more frames which start only a one or more frames later the frame in which the MOP is contained, for example when the UE needs some time to prepare itself for the IF-measurements.

Furthermore, the measurement opportunity indicator is sent on the down-link transmission channel to all subscriber stations presently in connected mode on a common transport channel. However, the measurement opportunity indicator can also be made individual for each subscriber station such that each subscriber station or a group of subscriber stations monitoring the down-link transmission channel can decide on its own as to whether or not it can perform IF measurements or not. However, mostly the network control means will decide in a unique manner for all presently logged on subscriber stations in connected mode on a common transport channel as to whether or not IF measurements can be carried out or not. That is, all presently logged on subscriber stations should simultaneously carry out IF measurements. However, as explained before, it is also possible that subscriber station-individual measurement opportunity indicators are inserted into the respective transmission frames, preferably at the beginning of a transmission frame.

Hereinafter, some embodiments of the present invention will be described with reference to FIGS. 9a, 9b and with reference to the flow chart of the method according to the invention in FIG. 9c.

First Embodiment (FACH Channel)

Figure 7A:
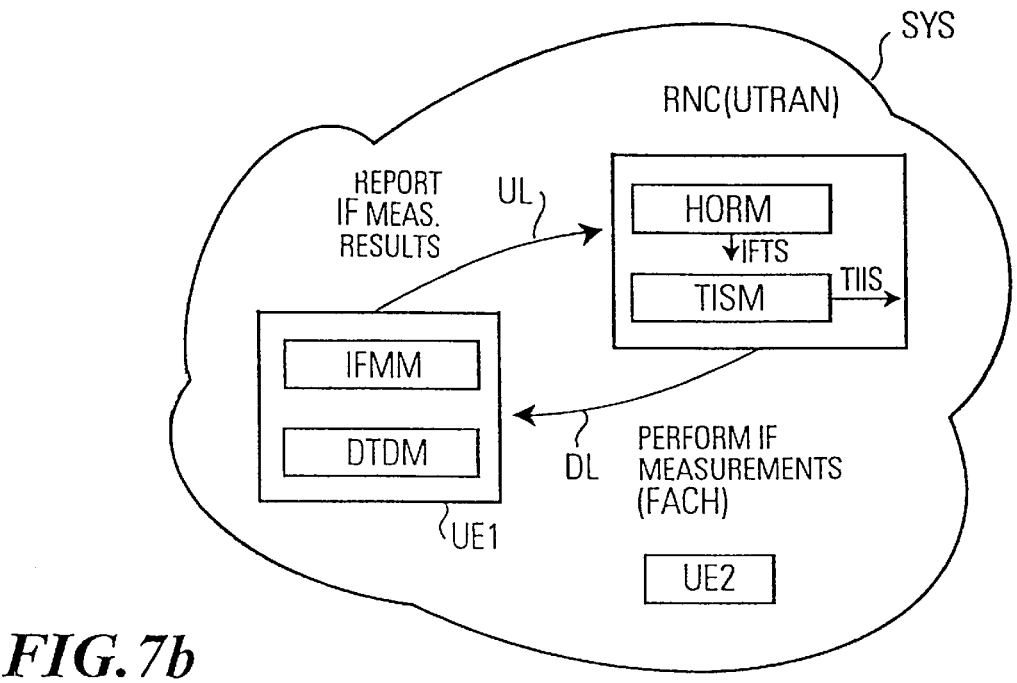
FIGS. 7a,b,c show a conventional transmission of data on FACH channels and PCH channels.
Figure 7B:
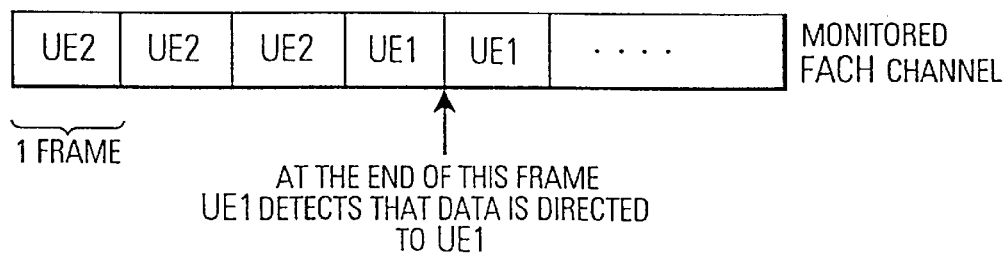
Figure 7C:
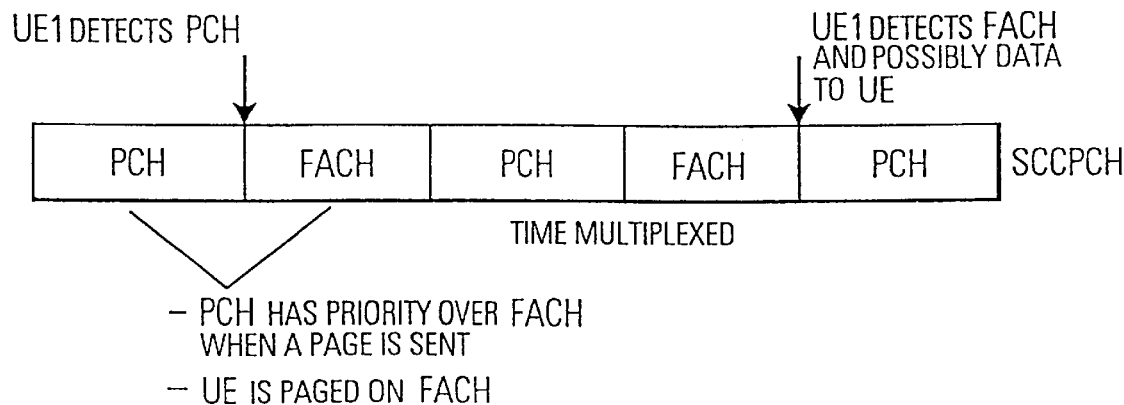

As explained above with reference to FIG. 7c, the down-link transmission channel DL can be one of the secondary common control physical channels SCCPCH in a WCDMA mobile communication system. As shown in FIG. 9a, according to one embodiment of the invention, the measurement opportunity indicator MOP is inserted at the beginning of each data transmission frame FR1–FR4 on this SCCPCH channel. As also explained above, each frame FR1–FR4 contains data directed to one of the subscriber stations UE1, UE2 presently logged on in the mobile communication system, i.e. being in connected mode on a common transport channel. In FIG. 9a two possibilities are indicated when the subscriber station UE1 can carry out these IF measurements. For example in frame FR1 the network data transmission determining means DTDM has determined that no data transmission will take place to any of the subscriber stations, MOP=NO, and therefore, in frame FR1 all subscriber stations can carry out IF measurements. If on the other hand in frame FR4 the measurement opportunity indicator MOP indicates that the frame FR4 contains some relevant data, e.g. for UE1, all subscriber stations will read this frame FR4, MOP=YES, and therefore, all subscriber stations including UE1 will read this data frame.

FIG. 9b shows for frames FR2, FR3 also another example where the measurement opportunity indicator MOP is subscriber station specific. If for example the MOPs in frames FR2, FR3 indicate that the present frame contains transmission data for UE2 only, then the subscriber station UE1 can determine by reading this measurement opportunity indicator MOP that it can do nothing (frame FR2) or can actually perform IF measurements (frame FR3) since the data contained in the frame is not intended to this subscriber station.

Second Embodiment (FACH, PCH Channels)

FIG. 9b shows the second embodiment of the invention where a first type of data transmission, for example data on the FACH channel, is multiplexed with a second type of data transmission, for example page data on the PCH channel, on the down-link transmission channel, for example the secondary common control physical channel SCCPCH. As explained above, the data contained in frames FR2', FR3', i.e. the page data, most normally also be read by the subscriber stations. Only after reading these frames in the prior art the subscriber station or the subscriber stations will be able to determine that they contain actually no relevant data to be read and processed.

According to the second embodiment, the MOP indicator is again inserted at the beginning of each frame FR1', FR2', FR3', FR4' and can indicate either for all subscriber stations or in a subscriber station-specific way whether the respective frame contain data that needs to be decoded or whether the presently logged on subscriber stations or a specific subscriber station can carry out IF measurements.

For example, in frame FR4' the MOP indicator indicates for all subscriber stations, MOP=YES, that data need to be read. Therefore, also the subscriber station UE1 reads data from the common control channel. Furthermore, in frame FR3' the MOP indicator indicates, MOP=NO, that the data contained in the PCH channel does not have to be read and decoded and therefore IF measurements can be carried out by all subscriber stations, including the subscriber station UE1. In frame FR1' the FACH channel indeed contains data provided for UE2, however, the MOP indicator indicates specifically that only UE2 should read data, i.e. the subscriber station UE1 can perform IF measurements in this frame. For the frame FR2' another example is shown where actually no data needs to be decoded and read from the PCH channel, however, a trigger signal has as yet not been received from the network control means. Therefore, the subscriber station UE1 can decide to remain in connected mode on a common transport channel.

FIG. 9c shows the general flow chart of the method according to the invention. In step ST2c1 the MOP determining means MOPDM determines that there is contained an MOP indicator at the beginning of a frame FR. In step ST2c2 the MOPDM means reads this MOP indicator and in step ST2c3 it determines whether or not the MOP indicator indicates that a frame needs to be read or not by decoding the MOP indicator (for example by determining whether a bit in the MOP indicator is set to "0" or "1". If the MOP indicator indicates the need for reading a frame then in step ST2c4 the frame is read and the loop goes back to step ST2c1.

If the MOP indicator indicates that there is no need for reading and decoding data, then in step ST2c5 it is determined whether as yet a trigger signal has been received from the network control means. If the IF trigger signal has been received, then the subscriber station carries out the IF measurements in step ST2c6. If the trigger signal has as yet not been received in step ST2c7 the subscriber stations can remain in idle-mode or in connected mode on a common transport channel do something else since the trigger signal has not as yet been received.

It should be noted that also in the flow chart in FIG. 9c the step ST2c4 can relate to the reading of the frame data which is contained in the same frame in which the MOP indicator is contained. However, if the MOP indicator has additional information that for example only a few frames later there is no need for reading and decoding data, then the IF measurements will only be carried in step ST2c6 a few frames later as indicated in the MOP indicator. Furthermore, the IF measurements in step ST2c6 can be carried out on a subscriber station-specific basis, i.e. specific subscriber stations, depending on the information contained in the MOP indicator can decide, to either read the data or to perform IF measurements.

Thus, the invention introduces the measurement opportunity indicator in the frame structure and by reading this indicator the subscriber stations UE know in advance whether they must read the next frame or not. If not, they can use this time for measurements or perhaps save some resources. The measurement opportunity indicator MOP can again be only one bit and it can be sent on the FACH frames and the FCH frames or only on the FACH frames or the PCH frames, if present, on the secondary common control channel.

Third Embodiment (Selective MOP Sending)

Figure 10:
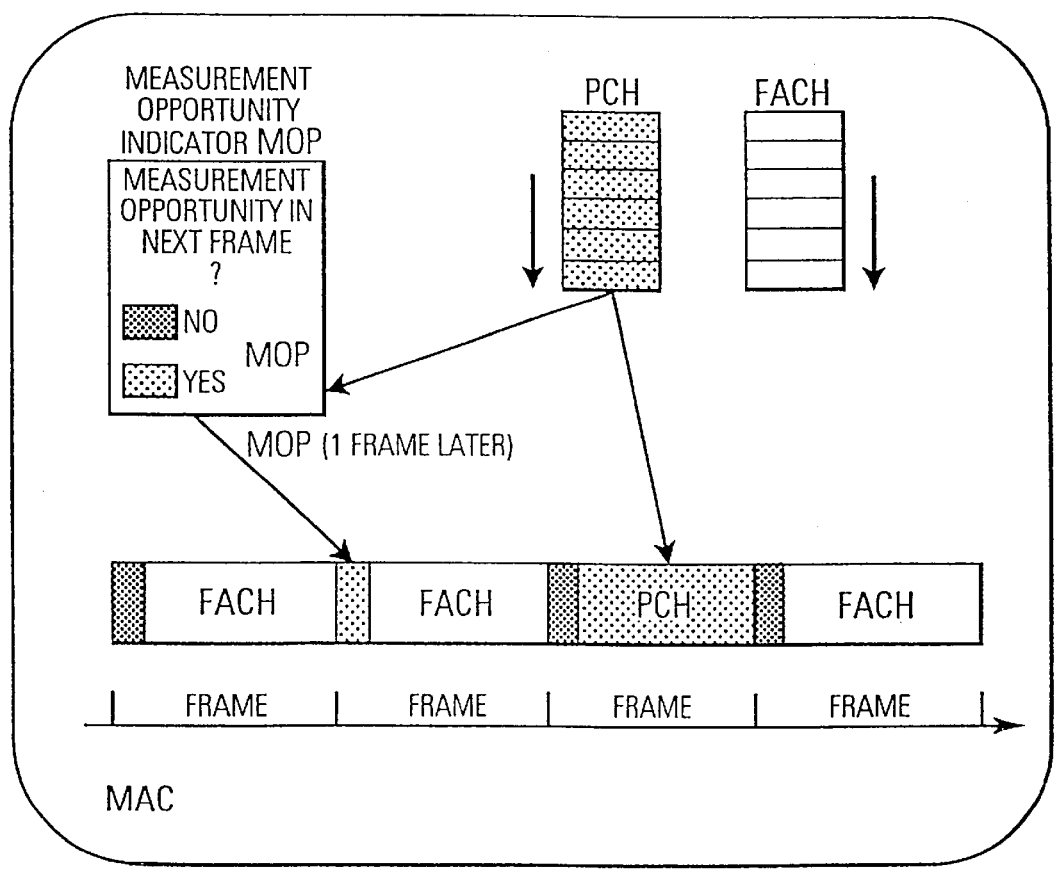
FIG. 10 shows a diagram where a media access control layer (layer 2) determines the minimum number of measurement opportunities when inserting the measurement opportunity indicator.

FIG. 10 shows a third embodiment of the invention where the network control means can calculate the minimum number of measurement opportunities needed for inter-frequency measurements and make sure that positive measurement opportunity indicators are sent as often as needed.

In FIG. 10 a measurement opportunity is created when a PCH frame is sent. However, the measurement opportunity indicator MOP is set to "YES" in the frame proceeding the PCH frame and therefore notifies the subscriber stations UE in advance. Here, the measurement opportunity came from a PCH frame meant for someone else. However, a measurement opportunity also occurs when there is no information to transmit at all. Then, the measurement opportunity indicator can be used to let the subscriber station UE know this in advance.

Therefore, although preferably the MOP indicator is always sent at the beginning of the frame for which it should indicate that there is a need to read data or not, it is also possible, according to FIG. 10, that the MOP indicator is indicated one or more frames in advance and indicates that only a few frames later there is a IF measurement opportunity.

FIG. 10 shows a possible implementation in the media access control layer (layer 2) MAC in a WCDMA mobile communication system.

Fourth Embodiment (PICH Channel)

As explained above, the MOP indicators can be inserted on the SCCPCH channel either at the beginning of a FACH frame or a PCH frame. Alternatively, instead of sending the measurement opportunity indicator on the SCCPCH channel, some of the reserved bits on the paging indication channel PICH, a special paging channel, can be used. This alternative is particularly useful in a cell with only one SCCPCH. However, it should be considered that a cell might have several SCCPCHs and that the subscriber station UE must know to which SCCPCHs the measurement opportunity indicator applies. Therefore, when the MOP indicator is sent on the PICH channel, it also contains some information about the relevant SCCPCH channel on which frames data must be read and decoded or cannot be read and decoded such that time is available to perform IF measurements.

Furthermore, if the MOP indicator is to indicate that data in a particular SCCPCH channel of a particular frame are not necessary to be read, preferably the MOP indicator on the PICH channel should be synchronized to the beginning of the frames on SCCPCH channel.

INDUSTRIAL APPLICABILITY

Although it has been explained above that the MOP indicator can be sent at the beginning of special FACH and PCH frames on a secondary common control physical channel SCCPCH well defined in the WCDMA standards of ETSI, of course the concept of the present invention can be applied to any other mobile communication system where a frame-wise transmission of data is carried out on a down-link transmission from the base transceiver station to the subscriber stations presently in connected mode on a common transport channel. Therefore, the above-mentioned examples with respect to the WCDMA system is only one preferred embodiment of the invention.

As explained above, according to the invention the subscriber stations can perform inter-frequency measurements without losing any data sent from the network. If the MOP indicator contains more than one bit, measurements can be performed longer than one frame with each bit indicating whether data need to be read or not in the succeeding frames. If the MOP indicator contains more than one bit, the subscriber stations can be divided into groups which perform measurements at different occasions, i.e. a subscriber station-specific IF measurement procedure is possible. Alternatively, the MOP indicator can group subscriber stations according to the existing access classes. The subscriber stations may use the time for IF measurements or to save resources, if possible. For example, if there are many opportunities during a time interval, the subscriber station may not need all of them and can then use this frame for something else, like saving resources or doing nothing.

Furthermore, it should be understood that the above described embodiments only describe the preferred mode of the invention as presently conceived by the inventors. However, on the basis of the above teachings further modifications and variations can be carried out within the scope of the attached claims.

Reference numerals in the attached claims only serve clarification purposes and do not limit the scope of protection.

What is claimed is:

1. Subscriber station (UE) of a mobile communication system (GSM; WCDMA, SYS) including an inter-frequency (IF) measurement means (IFMM) adapted to perform IF measurements and a data transmission determining means (DTDM) adapted to determine a predetermined time interval in which a base transceiver station (RBS) does not direct to subscriber stations (UE1, UDE2) a data transmission on at least one down-link transmission channel (FACH, PCH, SCCPCH) on which data transmissions are performed by sending data frames (FR1–FR4) from the base transceiver station (RBS) to one or more subscriber stations (UE1, UE2), wherein said IF measurement means (IFMM) is adapted to perform said IF measurements in said predetermined time interval,
wherein
said data transmission determining means (DTDM) includes a measurement opportunity indicator determining means (MOPDM) for monitoring the receipt of a measurement opportunity indicator (MOP) transmitted from said base transceiver station (RBS) and for determining as said predetermined time interval the time interval of at least one frame in said down-link transmission channel (FACH, PCH, SCCPCH).

2. Subscriber station (UE) according to claim 1,
wherein
said measurement opportunity indicator (MOP) is transmitted to said subscriber station (UE) on said down-link transmission channel (FACH, PCH, SSPCH) at the beginning of a frame (FR) or on a separate control channel (PICH) synchronized to the beginning of a frame (FR) in said down-link transmission channel (FACH, SSPCH).

3. Subscriber station (UE) according to claim 1,
wherein
said down-link transmission channel (FACH, PCH, SSPCH) includes a first type data transmission (FACH) in which data is sent in frames (FR1–FR4) from the said base transceiver station (RBS) to the subscriber stations (UE) wherein said measurement opportunity indicator (MOP) is contained at the beginning of all frames (FR1–FR4) wherein the measurement opportunity indicators (MOP) indicates either the opportunity that an IF measurement can be performed in at least the frame following the measurement opportunity indicator (MOP) or indicates that the next frame (FR1–FR4) contains data directed to the subscriber station (UE).

4. Subscriber station (UE) according to claim 3,
wherein
said down-link transmission channel (FACH, PCH, SSPCH) also includes a second type data transmission (PCH) in which page data is transmitted in frames (FR1–FR4) which is not used for data transmission, wherein said measurement opportunity indicator (MOP) is also contained at the beginning of all frames (FR1–FR4; FR1'–FR4') wherein all measurement opportunity indicators (MOP) contained in the frames of the second type data transmission (PCH) indicate the opportunity that an IF measurement can be performed in at least the frame following the measurement opportunity indicator (MOP).

5. Subscriber station (UE) according to claim 4,
wherein
said first type data transmission (FACH) and said second type data transmission (PCH) is multiplexed on said transmission channel (FACH, PCH; SSPCH).

6. Subscriber station (UE) according to claim 1,
wherein
said measurement opportunity indicator (MOP) also indicates the number of succeeding frames (FR) over which the IF measurements should be carried out by said IF measurement means (IFMM) after receipt of said measurement opportunity indicator (MOP).

7. Subscriber station (UE) according to claim 1,
wherein
said measurement opportunity indicator (MOP) also indicates a subscriber station identification which identifies at least one subscriber station (UE1, UE2) which can carry out IF measurements in said at least one frame following the receipt of the measurement opportunity indicator (MOP).

8. Subscriber station (UE) according to claim 1, wherein
said mobile communication system (GSM, WCDMA, SYS) is a WCDMA (Wide Band Code Division Multiple Access) communication system.

9. Subscriber station (UE) according to claim 1 wherein
said down-link transmission channel (FACH, PCH; SCCPCH) is a Forward Access Channel (FACH) and said first type data transmission (FACH) is a data frame transmission (FR) on said Forward Access Channel (FACH).

10. Subscriber station (UE) according to claim 7, wherein
said second type data transmission (FACH) is a page data frame transmission (PCH) of a Page CHannel (PCH).

11. Subscriber station (UE) according to claim 10, wherein
said page channel (PCH) and said Forward Access Channel (FACH) are time multiplexed on a Special Carrier Control Page Channel (SCCPC).

12. Subscriber station (UE) according to claim 10, wherein
said separate control channel (PICH) is a Paging Indication Channel (PICH).

13. Network control means (RNC) of a mobile communication system (GSM; WCDMA, SYS) comprising a plurality of subscriber stations (UE) each including an inter-frequency (IF) measurement means (IFMM) adapted to perform IF measurements and a data transmission determining means (DTDM) adapted to determine a predetermined time interval in which a base transceiver station (RBS) of said system does not direct to said subscriber stations (UE1, UE2) a data transmission on at least one down-link transmission channel (FACH, PCH, SCCPCH) on which data transmissions are performed by sending data frames (FR1–FR4) from the base transceiver station (RBS) to one or more subscriber stations (UE1, UE2), wherein each said IF measurement means (IFMM) is adapted to perform said IF measurements in said predetermined time interval, including
a network data transmission determination means (DTDM) for determining as said predetermined time interval a time interval of at least one frame in said down-link transmission channel (FACH, PCH, SCCPCH) in which a base transceiver station (RBS) of said system does not direct to said subscriber stations (UE1, UDE2) a data transmission; and
a measurement opportunity indicator sending means (MOPSM) for sending to one or more subscriber stations (UE1, UE2) a measurement opportunity indicator (MOP) when said network data transmission determination means (DTDM) determines said one or more frames in which no data transmission takes place.

14. Network control means (RNC) according to claim 13, wherein
said measurement opportunity indicator sending means (MOPSM) is adapted for transmitting said measurement opportunity indicator (MOP) to said subscriber station (UE) on said down-link transmission channel (FACH, PCH, SSPCH) at the beginning of a frame (FR) or on a separate control channel (PICH) synchronized to the beginning of a frame (FR) in said down-link transmission channel (FACH, SSPCH).

15. Network control means (RNC) according to claim 13, wherein
said down-link transmission channel (FACH, PCH, SSPCH) includes a first type data transmission (FACH) in which data is sent in frames (FR1–FR4) from the said base transceiver station (RBS) to the subscriber stations (UE) wherein said measurement opportunity indicator sending means (MOPSM) incorporates said measurement opportunity indicator (MOP) at the beginning of all frames (FR1–FR4) wherein the measurement opportunity indicators (MOP) indicates either the opportunity that an IF measurement can be performed in at least the frame following the measurement opportunity indicator (MOP) or indicates that the next frame (FR1–FR4) contains data directed to the subscriber station (UE).

16. Network control means (RNC) according to claim 15, wherein
said down-link transmission channel (FACH, PCH, SSPCH) also includes a second type data transmission (PCH) in which data is transmitted in frames (FR1–FR4) which is not used for data transmission, wherein said measurement opportunity indicator sending means (MOPSM) incorporates said measurement opportunity indicator (MOP) at the beginning of all frames (FR1–FR4; FR1'–FR4') wherein all measurement opportunity indicators (MOP) contained in the frames of the second type data transmission (PCH) indicate the opportunity that an IF measurement can be performed in at least the frame following the measurement opportunity indicator (MOP).

17. Network control means (RNC) according to claim 16, wherein
said first type data transmission (FACH) and said second type data transmission (PCH) is multiplexed on said transmission channel (FACH, PCH; SSPCH).

18. Network control means (RNC) according to claim 13, wherein
said measurement opportunity indicator (MOP) transmitted by said measurement opportunity indicator sending means (MOPSM) also indicates the number of succeeding frames (FR) over which the IF measurements should be carried out by said IF measurement means (IFMM) after receipt of said measurement opportunity indicator (MOP).

19. Network control means (RNC) according to claim 13, wherein
said measurement opportunity indicator (MOP) transmitted by said measurement opportunity indicator sending means (MOPSM) also indicates a subscriber station identification which identifies at least one subscriber station (UE1, UE2) which can carry out IF measurements in said at least one frame following the receipt of the measurement opportunity indicator (MOP).

20. A mobile communication system (SYS) comprising at least one subscriber station (UE) according to one or more of claims 1–13 and at least one network control means (RNC) according to one or more of claims 13–19.

21. A method for performing inter-frequency (IF) measurements in a subscriber station (UE) of a mobile communication system (GSM; WCDMA, SYS) wherein in said subscriber station (UE) a predetermined time interval is determined in which a base transceiver station (RBS) will not direct to said subscriber station (UE1) a data transmission on at least one down-link transmission channel (FACH, PCH, SCCPCH) on which data transmissions are performed by sending data frames (FR1–FR4) from a base transceiver station (RBS) to one or more subscriber stations (UE1, UE2), comprising the following steps:

monitoring the receipt of a measurement opportunity indicator (MOP) transmitted from said base transceiver station (RBS) to said subscriber station (UE); and determining as said predetermined time interval the time interval of at least one frame in said down-link transmission channel (FACH, PCH, SCCPCH).

22. A method according to claim 21,
wherein
said measurement opportunity indicator (MOP) is transmitted to said subscriber station (UE) on said down-link transmission channel (FACH, PCH, SSPCH) at the beginning of a frame (FR) or on a separate control channel (PICH) synchronized to the beginning of a frame (FR) in said down-link transmission channel (FACH, SSPCH).

23. A method according to claim 21,
wherein
said down-link transmission channel (FACH, PCH, SSPCH) includes a first type data transmission (FACH) in which data is sent in frames (FR1–FR4) from the said base transceiver station (RBS) to the subscriber stations (UE) wherein said measurement opportunity indicator (MOP) is contained at the beginning of all frames (FR1–FR4) wherein the measurement opportunity indicators (MOP) indicates either the opportunity that an IF measurement can be performed in at least the frame following the measurement opportunity indicator (MOP) or indicates that the next frame (FR1–FR4) contains data directed to the subscriber station (UE).

24. A method according to claim 23,
wherein
said down-link transmission channel (FACH, PCH, SSPCH) also includes a second type data transmission (PCH) in which data is transmitted in frames (FR1–FR4) which is not used for data transmission, wherein said measurement opportunity indicator (MOP) is also contained at the beginning of all frames (FR1–FR4; FR1'–FR4') wherein all measurement opportunity indicators (MOP) contained in the frames of the second type data transmission (PCH) indicate the opportunity that an IF measurement can be performed in at least the frame following the measurement opportunity indicator (MOP).

25. A method according to claim 24,
wherein
said first type data transmission (FACH) and said second type data transmission (PCH) is multiplexed on said transmission channel (FACH, PCH; SSPCH).

26. A method according to claim 21,
wherein
said measurement opportunity indicator (MOP) also indicates the number of succeeding frames (FR) over which the IF measurements should be carried out by said IF measurement means (IFMM) after receipt of said measurement opportunity indicator (MOP).

27. A method according to claim 21,
wherein
said measurement opportunity indicator (MOP) also indicates a subscriber station identification which identifies at least one subscriber station (UE1, UE2) which can carry out IF measurements in said at least one frame following the receipt of the measurement opportunity indicator (MOP).

28. A method according to claim 21,
including the steps of:

determining as said predetermined time interval in a network data transmission determination means (DTDM) a time interval of at least one frame in said down-link transmission channel (FACH, PCH, SCCPCH) in which a base transceiver station (RBS) of said system does not direct to said subscriber stations (UE1, UDE2) a data transmission; and sending by a measurement opportunity indicator sending means (MOPSM) to one or more subscriber stations (UE1, UE2) said measurement opportunity indicator (MOP) when said network data transmission determination means (DTDM) determines said one or frames in which no data transmission takes place.

29. A subscriber station according to claim 1,
wherein
said time interval of at least one frame is the time interval beginning with the receipt of said measurement opportunity indicator (MOP).

30. A network control means according to claim 13,
wherein
said time interval of at least one frame is the time interval beginning with the receipt of said measurement opportunity indicator (MOP).

31. A method according to claim 21,
wherein
said time interval of at least one frame is the time interval beginning with the receipt of said measurement opportunity indicator (MOP).

32. Subscriber station (UE) of a mobile communication system (GSM; WCDMA, SYS) including an inter-frequency (IF) measurement means (IFMM) adapted to perform IF measurements and a data transmission determining means (DTDM) adapted to determine a predetermined time interval in which a base transceiver station (RBS) does not direct to subscriber stations (UE1, UDE2) a data transmission on at least one down-link transmission channel (FACH, PCH, SCCPCH) on which data transmissions are performed by sending data frames (FR1–FR4) from the base transceiver station (RBS) to one or more subscriber stations (UE1, UE2), wherein said IF measurement means (IFMM) is adapted to perform said IF measurements in said predetermined time interval,
wherein
said data transmission determining means (DTDM) includes a measurement opportunity indicator determining means (MOPDM) for monitoring the receipt of a measurement opportunity indicator (MOP) transmitted from said base transceiver station (RBS) and for determining as said predetermined time interval the time interval of at least one frame in said down-link transmission channel (FACH, PCH, SCCPCH); and said time interval of at least one frame is the time interval beginning with the receipt of said measurement opportunity indicator (MOP).

33. Network control means (RNC) of a mobile communication system (GSM; WCDMA, SYS) comprising a plurality of subscriber stations (UE) each including an inter-frequency (IF) measurement means (IFMM) adapted to perform IF measurements and a data transmission determining means (DTDM) adapted to determine a predetermined time interval in which a base transceiver station (RBS) of said system does not direct to said subscriber stations(UE1, UE2) a data transmission on at least one down-link transmission channel (FACH, PCH, SCCPCH) on which data transmissions are performed by sending data frames (FR1–FR4) from the base transceiver station (RBS) to one or more subscriber stations (UE1, UE2), wherein each said IF measurement means (IFMM) is adapted to perform said IF measurements in said predetermined time interval, including a network data transmission determination means (DTDM) for determining as said predetermined time interval a time interval of at least one frame in said down-link transmission channel (FACH, PCH, SCCPCH) in which a base transceiver station (RBS) of said system does not direct to said subscriber stations (UE1, UDE2) a data transmission; and a measurement opportunity indicator sending means (MOPSM) for sending to one or more subscriber stations (UE1, UE2) a measurement opportunity indicator (MOP) when said network data transmission determination means (DTDM) determines said one or more frames in which no data transmission takes place; and said time interval of at least one frame is the time interval beginning with the receipt of said measurement opportunity indicator (MOP).

34. A method for performing inter-frequency (IF) measurements in a subscriber station (UE) of a mobile communication system (GSM; WCDMA, SYS) wherein in said subscriber station (UE) a predetermined time interval is determined in which a base transceiver station (RBS) will not direct to said subscriber station (UE1) a data transmission on at least one down-link transmission channel (FACH, PCH, SCCPCH) on which data transmissions are performed by sending data frames (FR1–FR4) from a base transceiver station (RBS) to one or more subscriber stations (UE1, UE2), comprises the following steps:

monitoring the receipt of a measurement opportunity indicator (MOP) transmitted from said base transceiver station (RBS) to said subscriber station (UE); and determining as said predetermined time interval the time interval of at least one frame in said down-link transmission channel (FACH, PCH, SCCPCH); and said time interval of at least one frame is the time interval beginning with the receipt of said measurement opportunity indicator (MOP).

* * * * *